(12) United States Patent
Buczek et al.

(10) Patent No.: US 8,420,180 B2
(45) Date of Patent: Apr. 16, 2013

(54) ELECTROSTATIC SPRAY FOR COATING AIRCRAFT ENGINE COMPONENTS

(75) Inventors: Matthew B. Buczek, Hamilton, OH (US); Andrew J. Skoog, West Chester, OH (US); Mark Rechtsteiner, Cincinnati, OH (US); Jane Ann Murphy, Franklin, OH (US)

(73) Assignee: General Electric Company, Schenectady, NY (US)

( * ) Notice: Subject to any disclaimer, the term of this patent is extended or adjusted under 35 U.S.C. 154(b) by 553 days.

(21) Appl. No.: 12/343,852

(22) Filed: Dec. 24, 2008

(65) Prior Publication Data

US 2009/0148614 A1 Jun. 11, 2009

Related U.S. Application Data

(63) Continuation of application No. 11/272,167, filed on Nov. 10, 2005, now abandoned, and a continuation of application No. 10/798,134, filed on Mar. 10, 2004, now abandoned.

(51) Int. Cl.
*B05D 1/06* (2006.01)

(52) U.S. Cl.
USPC ............ 427/461; 427/470; 427/475; 427/185

(58) Field of Classification Search .................. 427/461, 427/470, 475, 185
See application file for complete search history.

(56) References Cited

U.S. PATENT DOCUMENTS

| | | | |
|---|---|---|---|
| 3,248,251 A | 4/1966 | Allen | |
| 4,071,638 A | 1/1978 | Chang et al. | |
| 4,082,860 A | 4/1978 | Corbett et al. | |
| 4,101,713 A | 7/1978 | Hirsch et al. | |
| 4,319,924 A | 3/1982 | Collins, Jr. et al. | |
| 4,381,323 A | 4/1983 | Lowe et al. | |
| 5,215,785 A | 6/1993 | Strasser et al. | |
| 5,250,360 A * | 10/1993 | Andrus et al. | 428/471 |

(Continued)

FOREIGN PATENT DOCUMENTS

| | | |
|---|---|---|
| EP | 0295975 A1 | 12/1988 |
| GB | 1151079 A | 5/1969 |

OTHER PUBLICATIONS

"The Benefits of Powder Coating", The Powder Coating Institute, website: powdercoating.org/benefits, 4 pages.

(Continued)

*Primary Examiner* — Frederick Parker
(74) *Attorney, Agent, or Firm* — General Electric Company; William Scott Andes; David J. Clement (57) ABSTRACT

Electrostatic deposition of high performance powdered materials onto gas turbine surfaces. The process also includes post-deposition thermal staging of the deposited powder to provide a durable coating that will satisfy the demands of turbine engine operation. The process envisions application of organic-based powdered materials, glass/ceramic powdered materials and metal-based powdered materials and combinations thereof using electrostatic techniques to components exposed to low temperature operations, such as may be found in the front section of a gas turbine engine or to the exterior portions of an aircraft engine, and metal-containing glass ceramics, glass-ceramic materials, or materials that can be transformed into glass ceramic materials, when applied to components exposed to high temperature operations, such as may be found in the turbine and exhaust sections of a gas turbine engine or the flaps of an aircraft.

41 Claims, 5 Drawing Sheets

U.S. PATENT DOCUMENTS

| | | | |
|---|---|---|---|
| 5,260,099 | A | 11/1993 | Haskell |
| 5,353,995 | A | 10/1994 | Chabert |
| 5,472,783 | A | 12/1995 | Mosser et al. |
| 5,645,893 | A | 7/1997 | Rickerby et al. |
| 5,660,885 | A | 8/1997 | Hasz et al. |
| 5,743,121 | A | 4/1998 | Miller |
| 5,816,508 | A | 10/1998 | Hollstein et al. |
| 5,879,753 | A | 3/1999 | Zajchowski et al. |
| 5,976,695 | A | 11/1999 | Hajmrle et al. |
| 5,985,454 | A | 11/1999 | McMordie et al. |
| 6,126,758 | A | 10/2000 | Meelu et al. |
| 6,150,033 | A | 11/2000 | Mosser et al. |
| 6,177,186 | B1 | 1/2001 | Skoog et al. |
| 6,183,888 | B1 | 2/2001 | Alperine et al. |
| 6,428,630 | B1 | 8/2002 | Mor et al. |
| 6,503,575 | B1 | 1/2003 | Payne et al. |
| 6,525,161 | B1 | 2/2003 | Hall |
| 6,531,524 | B2 | 3/2003 | Ring et al. |
| 6,576,718 | B1 | 6/2003 | Yeager et al. |
| 6,649,267 | B2 | 11/2003 | Agawa et al. |
| 6,695,960 | B1 * | 2/2004 | Bacos et al. ............... 205/74 |
| 6,777,525 | B2 | 8/2004 | Pater |
| 6,866,897 | B2 | 3/2005 | Wang et al. |
| 7,124,729 | B2 | 10/2006 | Caracciolo |
| 2002/0023696 | A1 | 2/2002 | Jaslier et al. |
| 2002/0113151 | A1 | 8/2002 | Forber Jones et al. |
| 2003/0064234 | A1 * | 4/2003 | Payne et al. ............... 428/469 |
| 2003/0157363 | A1 | 8/2003 | Rigney et al. |
| 2004/0063817 | A1 | 4/2004 | Ilenda et al. |
| 2004/0068027 | A1 | 4/2004 | Daly et al. |
| 2004/0115477 | A1 | 6/2004 | Nesbitt |
| 2004/0159724 | A1 | 8/2004 | van der Steur |
| 2005/0079050 | A1 | 4/2005 | Kokusho |
| 2005/0266170 | A1 | 12/2005 | Nesbitt |

OTHER PUBLICATIONS

"Hawley's Condensed Chemical Dictionary Eleventh Edition", N. Irving Sax and Richard J. Lewis, Sr., Van Nostrand Reinhold Company Inc. Copyright 1987, 4 pages.

"Application Variables for Powder Coating Systems", Ken Kreeger, Nordson Corporation 1994, 8 pages.

"Complete Guide to Powder Coatings", Akzo Nobel, Issue 1, Nov. 1999, 46 pages.

* cited by examiner

ELECTROSTATIC SPRAY FOR COATING AIRCRAFT ENGINE COMPONENTS

CROSS-REFERENCE TO RELATED APPLICATIONS

This application is a continuation of U.S. patent application Ser. No. 10/798,134 filed Mar. 10, 2004 entitled POWDER COATING OF GAS TURBINE ENGINE COMPONENTS and U.S. patent application Ser. No. 11/272,167 filed Nov. 10, 2005 entitled ELECTROSTATIC SPRAY FOR COATING AIRCRAFT ENGINE COMPONENTS, both commonly assigned, both currently pending and both incorporated herein by reference.

FIELD OF THE INVENTION

The present invention is directed to a method of applying a powder coating to aircraft engine components, and specifically, to applying electrostatic coatings to aircraft gas turbine engine components in an environmentally friendly fashion.

BACKGROUND OF THE INVENTION

Gas turbine engine components employ coatings over base material in various applications to provide protection to the underlying structural base material. The purposes for applying the coatings are varied, and may include one or more purposes depending upon the application. For example, turbine airfoils used in the hot section or turbine section of a gas turbine engine include coatings to provide heat resistance and improved thermal capabilities. These airfoils also may be used in harsh environments, thereby additionally requiring coatings having resistance to corrosion or oxidation. Such coatings are referred to as environmental coatings.

Other applications may require still other coatings. For example, the shrouds surrounding the rotating airfoils, also referred to as blades, form a tunnel through which the hot gases pass. In addition to being able to withstand the hot, corrosive gases of combustion, these shrouds must also be abradable, as the rotating airfoils (blades) expand in a radial direction and contact the shrouds. It is desirable that, as contact is made between the rotating blades and the stationary shrouds that material be abraded from the shroud without affecting the structural integrity of the shrouds.

Of course, other sections of a gas turbine engine may require still other coatings. For example, in an aircraft engine, some components exposed to sand and rain may require erosion resistance. The specialized coatings in turbine engines are myriad. The coatings also may be applied to very large surface areas, such as shrouds, or to very small surface area, such as the tip regions of first stage turbine blades. The coatings also may be applied to a variety of substrate materials, such as for example superalloy materials, including nickel-based superalloys, cobalt-based superalloys, iron-based superalloys and combinations thereof, titanium and its alloys, and composites such as CMC's.

Although the structures to which the coatings are applied may vary, a few time-tested techniques have been utilized for their application. The techniques include a variety of modifications that solve particular problems. However the techniques generally include physical vapor deposition techniques (PVD), chemical vapor deposition techniques, thermal spray techniques, pack cementation techniques laser deposition techniques and plating techniques. A large number of patents have issued dealing with variations of the above-mentioned techniques, and many volumes could be filled discussing the differences distinguishing these variations. These techniques, including the multiple variations, typically produce high quality coatings, as required for demanding applications such as aircraft gas turbine techniques. However, the various techniques used for these applications have differing drawbacks. Some of the above-mentioned techniques, such as PVD, deposit the coating material by a slow, expensive process. Other techniques utilize solvents or release organic effluents, many of which are undesirable. Others, such as laser processing, require very high energy sources and expensive equipment. Still other processes leave undesirable by-products, such as heavy metals, for example chromium, which must be disposed of as hazardous waste. In general, two primary technologies have evolved in the coating industry: liquid coating technology, which may also be referred to as wet coating technology and powder coating technology, which may be referred to as dry coating technology.

Examples of the liquid coating technology include organic solvent type coatings and aqueous emulsion type coatings. Organic solvent type coatings, which are obtained by dissolving main components, such as resins, in an organic solvent and adding thereto auxiliary components, such as coloring agents, have been used widely in various coating applications. However, problems have been encountered with the use of these coatings, including fire hazards, adverse effects on safety/hygiene and environmental pollution. Accordingly, increased attention is being directed to coatings that vaporize no organic solvent, particularly aqueous emulsion type coatings and powder coatings.

Aqueous emulsion type coatings, however, also have certain shortcomings. For example, resin particles and a pigment are typically dispersed stably in an aqueous medium and thus a hydrophilic substance, such as an emulsifier, is employed during the production process. Additionally, the resultant film is often inferior in properties, such as alkali resistance and water resistance. Moreover, the film frequently has low adhesivity to the material being coated. It also takes a significant amount of time to obtain a dried film, as compared to that of an organic solvent type coating, and if it is necessary to complete the film drying in a short amount of time, then special equipment is required at higher costs.

In contrast, powder coatings, which contain no organic solvent, have various advantages. For example, powder coatings typically have very low volatile organic content and release very little volatile material to the environment when cured. Powder coatings are also free from flammable solvents, adverse effects on safety/hygiene and environmental pollution. Further advantages include the ability to be stored in an ordinary storehouse; the amount of ventilation air in a spray booth can be minimized and the air can be recirculated, resulting in high energy efficiency; and the coating film obtained has no foams generated by the vaporization of solvent during film drying. Other advantages of powder coatings include use without the necessity of adjusting viscosity, solid content, etc.; the coatings can be easily recovered without staining the operation site and producing any waste; and powder that does not adhere to a surface can be recycled. Furthermore, powder coatings can be applied by automated coating procedures and, in view of the total cost including cost of materials, pretreatment cost, cost of coating operation, equipment cost, etc., these coatings are very economical as compared to organic solvent type coatings and aqueous type coatings.

Powder coatings generally comprise a solid-film forming resin, often with one or more pigments. Thermosetting powder coating compositions and their method of preparation are described in U.S. Pat. No. 6,649,267 to Agawa et al. Similarly, U.S. Pat. No. 6,531,524 to Ring, et al. describes powder coating compositions. Although powder coatings may be thermoplastic-based, they are typically based on thermosetting materials. Themoplastic based coatings melt and flow onto the substrate during increases in temperature, but do not undergo a chemical reaction. Themoplastic based coatings are typically applied to a greater thickness than that of thermosetting coatings.

In contrast, thermosetting powder coatings melt upon increase in temperature and undergo a chemical reaction to polymerize through cross-linking mechanisms into a resistant resultant film. These thermosetting coatings do not remelt once the chemical reaction has occurred.

In general, powder coating technology is an advanced method of applying decorative and protective finishes to products to enhance features, such as color and scratch resistance. Typically, the powder coating is applied by a spray technique wherein the powder constituents are sprayed onto an article and then heated to fuse the powder onto the article. The powder particles are attracted to the article by an electrical charge. Industries that have benefited from powder coating technology include the appliance and architecture industries.

However, to the inventors' knowledge, powder coating technology has not been employed to coat gas turbine engine components in the aerospace industry. In particular, gas turbine engines operate at increasingly high temperatures due to the increased desire for further efficiency. Accordingly, the gas turbine engine components must be able to withstand the increased temperatures and thus coatings are often employed over the components to provide further protection. In particular, numerous coatings are used in gas turbine engine systems for purposes of: heat/thermal control, sand/rain erosion resistance, wear resistance, corrosion resistance/sacrificial coatings, and many others. A number of these coatings use solvents, which may be harmful or toxic. Some coatings also include constituents that allow them to work for special applications, but are toxic (e.g. chromium) or release organic effluents during processing. Additionally, the coatings must often operate at temperatures anywhere from subambient to extremely hot (e.g. in excess of 2000° F./1093° C.).

Thermal spray processes, including detonation gun deposition, plasma spray, electric wire arc spray, flame spray and high velocity oxy-fuel, have been extensively used in the gas turbine engine industry to deposit coatings on various engine components. In most of these thermal spray processes, materials such as ceramic, polymeric or metallic materials in wire, powder or other forms are heated to at or above its melting point. Droplets of the melted material are directed against the surface of a substrate to be coated via a gas stream and adhere and flow onto the component where a buildup of coating results. However, these processes are often complicated and require extensive equipment and set up procedures. Moreover, thermal spray processes may also be characterized similar to the liquid coating technology, shortcomings of which have been described above in detail.

Accordingly, there exists a need for a new method of coating gas turbine engine components. What is needed is a process that can deposit a variety of coatings on aircraft engine parts in an economical, fast, energy efficient process that has minimal environmental impact. One method that has heretofore not been used in gas turbine components is powder coating based on electrostatic deposition of powdered materials. While this method has been used for a variety of commercial products such as home appliances, basketball poles, lawn furniture, gas grills and certain automotive applications, the methods have not heretofore been extended for demanding applications such as gas turbine components, including aircraft engine applications. It is likely that such methods have not found their way into this art because they lack a reputation for durability in such demanding applications. The coating should be a durable coating for gas turbine engines that is quick, cost effective and environmentally friendly, and which can be readily adapted for application to both large and small surface areas.

SUMMARY OF THE INVENTION

The present invention is directed to electrostatic deposition of powdered materials onto gas turbine surfaces. The process also includes post-deposition thermal staging of the deposited powder to provide a durable coating that will satisfy the demands of turbine engine operation.

While the present invention is directed to applying powdered materials by electrostatic deposition, the present invention envisions application of organic-based powdered materials, glass/ceramic powdered materials and metal-based powdered materials and combinations thereof using electrostatic techniques to components exposed to low temperature operations, such as may be found in the front section of a gas turbine engine or to the exterior portions of an aircraft engine, and metal-containing glass ceramics, glass-ceramic materials, or materials that can be transformed into glass ceramic materials, to components exposed to high temperature operations, such as may be found in the turbine and exhaust sections of a gas turbine engine or the flaps of an aircraft. However the present invention may also find application in the combustor section of the engine, as well as in cooler engine sections such as the compressor section. Aircraft engine components that may be coated by the present process include, but are not limited to, shrouds, flaps, seals, liners, cowls, center bodies and combustors.

In accordance with one embodiment of the invention, there is provided a method of coating a gas turbine engine component using a powder coating process. The method comprises providing a gas turbine engine component, and applying a powder coating to the gas turbine engine component using the powder coating process. The powder coating is applied in a dry form without an organic solvent. The method further comprises heating the applied powder coating to melt and fuse particles of the powder coating to the gas turbine engine component and cure the powder coating.

In accordance with another embodiment of the invention, there is provided a method of coating a gas turbine engine component using a powder coating process. The method comprises providing a gas turbine engine component having an electrically conductive substrate, cleaning the gas turbine engine component prior to application of a powder coating, and applying a powder coating to the gas turbine engine component using the powder coating process. The powder coating is applied in a dry form without an organic solvent. The powder coating process comprises spraying and charging electrostatically the powder composition through a spray gun onto the gas turbine engine component, which is grounded, and heating the applied powder coating to melt and fuse particles of the powder coating to the gas turbine engine component and cure the powder coating.

The coating of the present invention is applied by determining the proper coating material to provide the required properties for the intended application. Then, the material is provided as a powder in a preselected size range. The size range is selected based on required coating thickness for the intended application. If the size range has a high fraction of large particles, the coating may not have the proper density. If the size range has excessive fines, flowability may be a problem. Substrate size and configuration may also be a consideration in determining the size range of the particles. The powder particles are fed to a high voltage powder spray gun. The article to be coated is grounded and the surface is positioned facing the powder spray gun. An electrical potential is established between the article and the powder spray gun. As the powder is sprayed from the gun, an electrical charge is imparted to the powder particles, which are then drawn toward the oppositely charged surface of the article. The polarity will depend on the types of particles that are sprayed. Metal particles can be sprayed if the particles are coated, either with an oxide coating or an inorganic coating, provided that the metal powder is isolated within the coating. For the purposes of this application, such coated metal particles will be referred to as metal-based powders.

The powdered coating is then cured to the gas turbine engine component. After the powder is applied to the article to a preselected thickness, the article is heat treated at an elevated temperature sufficient to form a strong bond between the substrate and the applied coating. When the applied coating applied using a metal-based powder, the heat treatment temperature should be sufficiently high so as to form a metallurgical bond between the substrate and the applied coating. Depending upon the application and powder size selected, it may be necessary to consolidate the coating prior to the final heat treatment if a high density coating is required.

An advantage of the present invention is that it can be readily tailored to gas turbine applications, which may include a variety of materials and surfaces of different sizes. The equipment used in the process is readily adaptable to the different components used in gas turbine applications. Changes in flow rates and voltages are readily made.

Another advantage of the present invention is that a wide variety of particle sizes can be mixed together and sprayed onto the surface of the particle. In addition, particles of different compositions can be mixed together and sprayed onto the article surface. This aspect of the invention can be utilized to apply well-known compositions or to achieve new compositions.

An important advantage of the present invention is that it is environmentally friendly, as the powder coating is applied in dry form, providing very high yields while using no organic solvents and less energy. Firing can be accomplished in very short time frames. For example, firing can be accomplished to temperatures of 1500° F. (816° C.) in times as short as six (6) minutes. Such rapid firing can be accomplished since no binder is utilized; thus, no slow binder burnout is required. In addition, the equipment, its maintenance and operation to apply the powdered coating is inexpensive compared to other coating processes used for gas turbine and aircraft engine applications.

The coating of the present invention can be tailored to yield high density or low density coatings as desired. Another advantage is that the thickness of the applied coating can also be controlled to meet existing tolerance requirements.

Yet another advantage of the present invention is that the powders utilized in the spray process, but which are not incorporated onto the substrate surface, can be recovered and reused. Thus, in terms of powder usage, the yield is well above 90%, and can approach 100%, since there is very little powder loss, particularly in large volume applications. This is important as the particles themselves, when they include heavy metals such as chromium or nickel, can constitute a hazardous waste. The reusability of the powders thus eliminates a source of hazardous waste.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
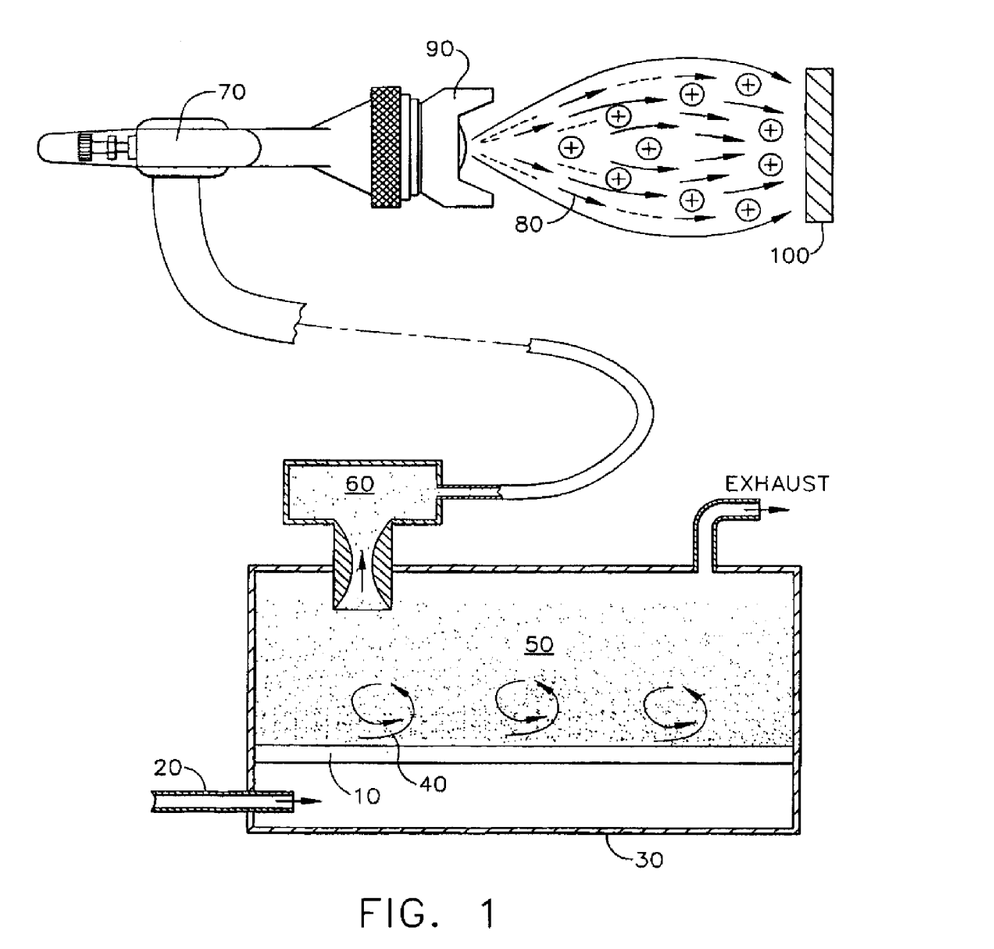
FIG. 1 is a schematic illustration of a method of powder coating a gas turbine engine component using a tribo electrostatic spray process, in accordance with an embodiment of the invention.
Figure 3:
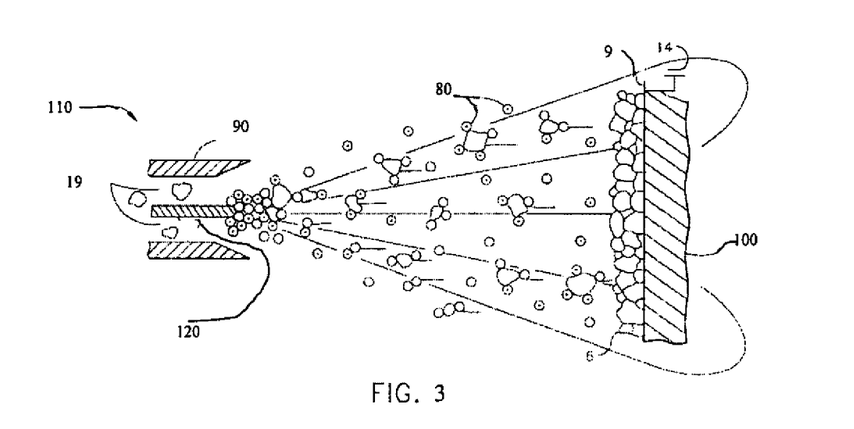
FIG. 3 depicts a powder spray gun nozzle, in cross-section, propelling a high performance powder coating at a gas turbine engine substrate.

The method of the present invention is implemented, in its simplest form, as depicted in FIGS. 1 and 3, in which methods of powder coating a gas turbine engine are disclosed.

The gas turbine engine component may be any type of gas turbine engine component, including but not limited to frames, controls and accessory equipment (e.g. gear boxes, oil tanks), blades, shafts, disks, vanes, combustor liners, exhaust flaps, exhaust seals, etc. Similarly, the component may be made out of any suitable material and is typically a metallic material, such as a nickel-based, cobalt-based or iron-based superalloy. However, the gas turbine engine component substrate may be any substrate capable of carrying an electrostatic charge. A non-metallic substrate, such as composites or ceramic materials, may also be employed provided the substrate may be modified to be electrically conductive. The substrate of the gas turbine engine component may be coated directly by the powder coating processes described herein or may have a powder coating applied over a preexisting coating(s) on the gas turbine engine component.

The substrate may be chemically or mechanically cleaned prior to application of a powder coating composition and is preferably subject to chemical pretreatment, for example, with iron phosphate, zinc phosphate or chromate. The substrate may also be preheated prior to application or pretreated with a material that will aid the powder coating application. This optional preheat also promotes uniform and thicker powder deposition.

The powder coatings applied to the gas turbine engine component may be any coating suitable to be applied by powder coating processes. Organic based, as well as inorganic based materials may be employed. Organic based materials are particularly suited for lower operating temperature components, such as inlet fans, frames, ducts, guide vanes, accessory equipment (e.g. oil tanks, gear boxes) and some exhaust components, having operating temperatures up to about 600° F. (316° C.). In general, organic polymers may be characterized by good flexibility and resistance to chemical attack by inorganic materials. Suitable organic based materials, which may be employed in embodiments of the invention, include fluoroelastomers, epoxies, and urethanes. Powder coatings also may be made of frit, which is a ground glass used in making glazes and enamels. Finely powdered glass may also be referred to as frit. The term, frit, may also refer to finely ground inorganic minerals, mixed with fluxes and coloring agents that form glass or enamel upon heating.

A powder coating composition may be conventionally prepared by mixing raw materials, such as resins, curing agents, plasticizers, stabilizers, fluidity modifiers, pigments and fillers in a mixer. This may be followed by melt-kneading the mixture in a high shear mixer, such as an extruder, to disperse the respective raw materials. The melt-kneaded mixture may then be cooled, ground into powders and classified. The use of particles of a particular size may impart specific desired properties to the cured powder-coated substrate, such as smoothness, fluidity and electrostatic coatability, as known in the powder coating industry.

Additives may also be added to the powder coating compositions depending upon the desired application. Examples of conventionally known additives include pigment dispersants, curing catalysts, flow modifiers, matting agents, blocking inhibitors, ultraviolet absorbers, photostabilizers, benzoin, antistatic agents, antioxidants and synthetic resins, such as epoxy resin, polyester resin, urethane resin, and polyamide resin.

In general, inorganic materials provide coating and bonding compositions having excellent heat and abrasion resistance and resistance to chemical attack or corrosion by organics and some inorganics. Inorganic materials are particularly suited for coating higher temperature operating components, including turbine blades and hot exhaust components, having operating temperatures up to about 2400° F. (1316° C.). Suitable inorganic based materials, which may be employed in embodiments of the invention include glass/enamels, glass, ceramics, glass/ceramic and matrix materials of the same admixed with metals.

Sacrificial electrically conductive coatings that prevent corrosion by corroding in place of the substrate are particularly useful to be deposited on gas turbine engine components, by embodiments described herein. In particular, when a more active metal is placed in contact with one that reacts more slowly, such as a more noble metal, the active metal will typically be consumed by the environmental factors before the other material begins to corrode. Thus, the more active metal may be said to "sacrifice" itself to protect the less active metal. A number of coating systems have been built around this sacrificial principle and may be employed herein. For example, aluminum-filled inorganic phosphate overlay coatings are useful to combat corrosion and erosion of steel components. U.S. Pat. No. 3,248,251 to Allen describe water-based slurries containing aluminum powder or alloy pigment particles dispersed in an acidic solution containing phosphates and hexavalent chromium ions which, upon exposure to heat and curing, transform to an insoluble metal/ceramic composite. Chromates or dichromates, molybdates, vanadates, tungstates and other ions may also be present. A commercial example of such a material is SermeTel W® manufactured by Sermatech International Inc. Coating compositions containing hexavalent chromium and phosphate are also described in other patents, such as U.S. Pat. Nos. 4,381,323 and 4,319,924.

Other inorganic coatings include various fritted glass materials for lower temperature use below about 1800° F. (982° C.). Similarly, other glass frits that are referred to as recrystalizable could be used for lower initial melting temperatures with higher final use temperatures. Additionally, glass/ceramic systems may use glass material as mentioned earlier as a matrix with ceramic particles trapped in this matrix. These ceramics can react with the glass matrix thereby raising the glass melting point and resulting in higher use temperatures. Suitable ceramics include alumina, zirconia, yttria stabilized zirconia (YSZ), MgO (magnesia), $TiO_2$ (titania), etc.

Preferably, the powder coating comprises nonconductive materials. However, conductive materials, such as metallic powder encapsulated in or coated with a nonconductive material, such as a ceramic, may also be employed.

The powder coatings may be applied to the gas turbine engine component by any suitable powder coating process. In general, the powder coating may typically be applied by electrostatic spray processes or fluidized bed processes. For example, the powder coatings may be applied by spraying and charging electrostatically the powder through a spray gun onto the gas turbine engine component. Powder coating processes, such as fluidized bed dipping, electrostatic brush processes and powder cloud applications may also be employed.

According to one embodiment of the invention, a method for forming a powder coating on a gas turbine engine component comprises applying a powder coating to a substrate by an electrostatic spray coating process and heating the applied coating to melt and fuse the particles and cure the coating. The electrostatic spray coating process may be a corona charging or tribo charging process. In the case of a tribo charging process, it is recommended that the powder coating composition should be one that has been formulated especially for such application, for example, by the use of suitable polymers of which the so-called "tribo-safe" grades are an example or by the use of additives, which can be introduced prior to extrusion in a manner known to those skilled in powder coating processing.

FIG. 1 schematically illustrates a tribo charging process for coating a gas turbine engine coating, in accordance with an embodiment of the invention. As shown in FIG. 1, an air supply 20 enters fluidizing chamber 30 including fluidizing air 40 and fluidizing powder 50. A porous medium 10, such as a porous polymeric material, may also often be placed between the incoming air and powder. The fluidizing powder 50 enters an atomizer 60 and exits as a mixture of powder and air where it then enters a tribo charging tube 70 or spray gun. Electrostatically charged particles 80 exit spray head or nozzle 90 and are attracted to gas turbine engine component 100, which is grounded.

Figure 2:
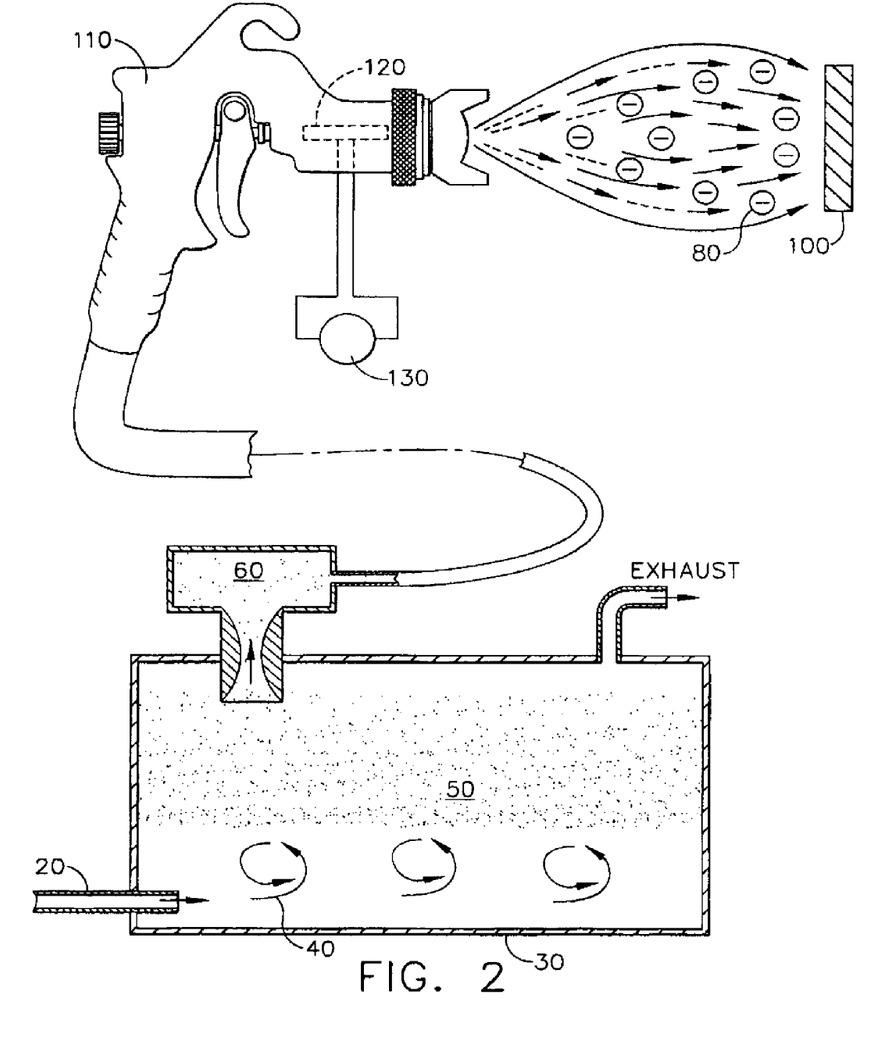
FIG. 2 is a schematic illustration of a method of powder coating a gas turbine engine component using a corona electrostatic spray process, in accordance with an embodiment of the invention.

In the embodiment shown in FIG. 2, which shows a corona type electrostatic spray coating process, an air supply 20 enters fluidizing chamber 30 including fluidizing air 40 and fluidizing powder 50. The fluidizing powder 50 enters air atomizer 60 and exists as a mixture of powder and air where it then enters corona spray gun 110. Enclosed in gun 110 is an electrode 120 in contact with a high voltage 130 of a generator (not shown). Electrostatically charged particles 80 exit the spray gun 110 and are attracted to gas turbine engine component 100, which is also grounded as in the case of a tribo spraying processes.

In another embodiment, depicted in FIG. 3, a powder spray gun 110 whose partially depicted nozzle or exit spray head 90 further includes an electrode 120. Charged powder particles 80 are propelled through nozzle 90 toward a surface 9 of a substrate of an engine component 100. The nozzle is grounded at 14 as shown in FIG. 3. A voltage is set up between electrode 120 and surface 9. As shown in FIG. 3, electrode 120 is negatively charged and substrate 100 is positively charged. As the charged particles 80 are propelled past electrode 120, a charge is imparted to the particle powders, which are additionally attracted electrostatically to surface 9. A layer 16 of charged powder particles 80 form on surface 9 of the substrate 100. It will be understood that the polarity of the electrode 120 and substrate 100 can be reversed as required.

Such a reversal of polarity may be desirable based on the chemistry of the powder particles so as to improve yield. It will also be understood that the nozzle itself may be designed as an electrode, or that the electrode may be built into the nozzle, rather than being positioned in the center of the nozzle orifice as depicted in FIG. 3.

Figure 4:
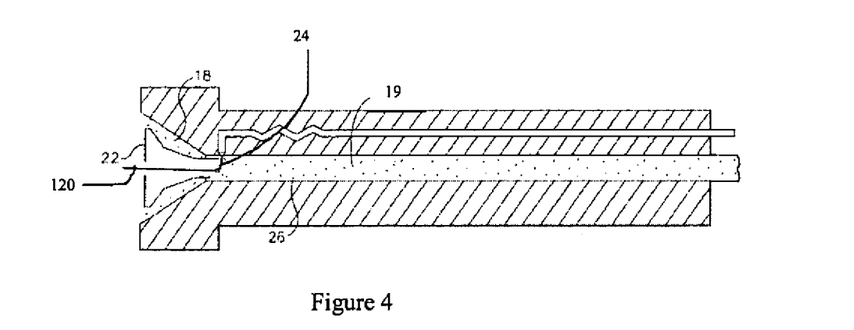
FIG. 4 depicts the powder spray gun nozzle of FIG. 3, in cross-section in greater detail.
Figure 5:
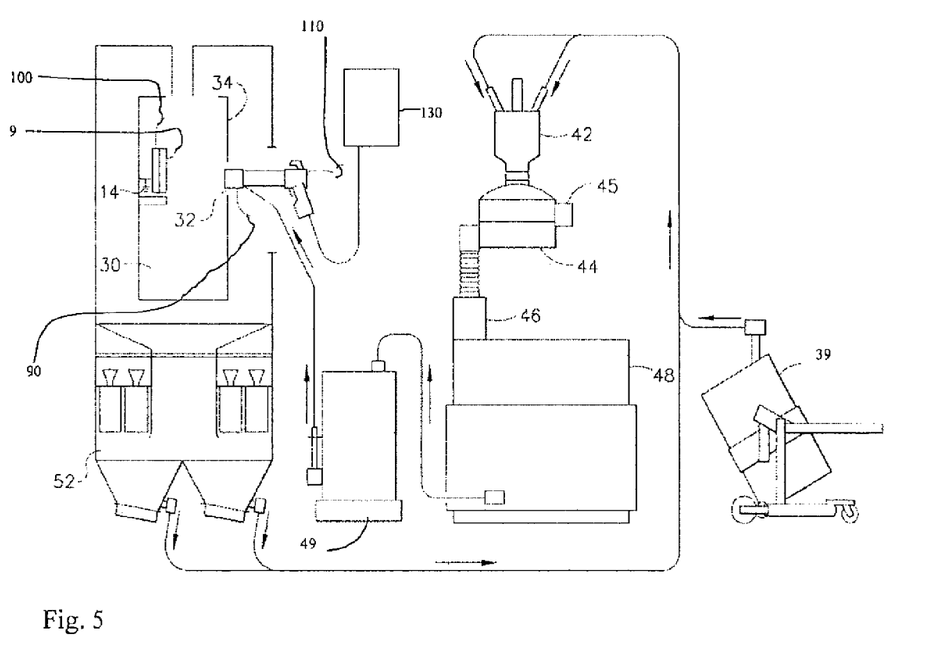
FIG. 5 schematically depicts a spray room operation using the powder spray nozzle of FIG. 3.

The nozzle or exit spray head 90 of FIG. 3 is shown in greater detail in FIG. 4. Electrode 120 is positioned at the mouth 18 of orifice 19 of nozzle or exit spray head 90. The mouth 18 of nozzle 90 is flared so that the volume of the nozzle at the mouth increases. As shown, nozzle 90 is chamfered or beveled. However, the flaring can be achieved by any other geometric configuration, such as a mouth having a concave or parabolic opening. A deflector 22 is positioned in mouth 18, surrounding electrode 120. Powder particles traveling through orifice 19 of nozzle 90 are deflected outwardly by deflector 22 as they reach nozzle 90, as shown in FIG. 4, and also are charged by electrode 120 as they pass through mouth 18. Electrode 120, as shown in FIG. 4, is connected to a power source via resistive wire 24 positioned in wall 26. As previously noted, this is but one configuration for the nozzle of a powder spray gun. Any other configuration that imparts a charge to powder particles exiting the nozzle may also be used.

The particle size distribution required for most commercial electrostatic spray apparatuses may typically be between about 10 and about 140 microns, with a mean particle size by volume within the range of about 15-75 microns. In the electrostatic spray process, powder coating particles are electrostatically charged and the charged particles are attracted to the substrate, which is earthed or oppositely charged. Any powder coating that does not adhere to the substrate can be recovered for re-use. Advantageously, the powder coatings are economical in use of ingredients, as well as non-polluting to the environment.

The powder may be cured on the substrate by application of heat, for instance by the process of stoving, typically for a period of from about 5 to about 30 minutes. Typically, the heating temperature is in the range of from about 302-752° F. (150-400° C.), although other suitable temperatures, such as about 248° F. (120° C.) may also be employed. These temperatures are particularly suitable for organic based powder coatings.

For high temperature glass/enamel and ceramic based coatings, firing may occur from about 200-2400° F. (93-1316° C.). Glass based or enamel powder compositions may also be used with metal or oxide additions to form high temperature thermal barrier coatings (TBC's). These may require temperatures between about 842-2800° F. (450-1538° C.) for between 5 minutes to 24 hours to achieve a proper cure. Cycle time is also dependent on the thickness of the coating. For example, a 50 mil coating may be heat treated to about 1540° F. (838° C.) in about 4 minutes. This is possible because no solvents or organics need to evolve.

The coating powder can be applied in a single sweep or in several passes. The thickness of the applied coating typically is less than or equal to about 200 microns, preferably less than about 50 microns, and most preferably less than about 30 microns for many applications. However, thicker TBC type ceramic/glass systems may be up to about 40+ mils (or 1016 microns) in thickness.

Preferably, a powder coating is applied to gas turbine engine component 100 by one of the afore-described electrostatic spray techniques. However, powder coatings may also be applied to gas turbine engine component 100 via conventional fluidized bed coating processes, which do not require the electrostatic charging of the powder prior to deposition. In a typical fluidized bed design, the bed is constructed as a booth or container including a top porous plate and a bottom air chamber. Powder is filled above the plate and is fluidized by the air below the plate. An electrically charged cloud of powder is formed, which is attracted to and deposits on the desired substrate exposed to the powder.

FIG. 5 schematically depicts another exemplary embodiment of the equipment used for the process of the invention in greater detail in a spray room operation. A gas turbine engine substrate 100 is depicted mounted in a chamber 30 and connected to ground at 14. Nozzle or exit spray head 90 of power spray gun 110 extends through an opening 32 in a wall 34 of chamber 30. A high voltage power pack or generator 130 is connected to the powder spray gun 110. Powder to be sprayed is loaded from a powder source, drum unloader 39 and provided to collector 42. Here the powder can be sieved in sieve 44, and when appropriate, run through a magnetic separator 46 to separate magnetic materiel from non-magnetic material. Oversized material can be removed from sieve through channel 45 and sent to a collection station (not shown). The powder then is moved into distribution hopper 48 and then into feed hopper 49. From here, the powder is fed into the nozzle or exit spray head 90 of gun 110. The charged powder particles 80 are then directed toward substrate 100. Any unused powder particles can be recovered by passing them through to recycle bin 52, where they can be redirected into collector 42.

To change powders, it is necessary to remove the drum from drum unloader 39 and purge the collector 42, sieve 44, magnetic separator 46 (if used) distribution hopper 48 and feed hopper 49, as well as recycle bin 52 of powder. Sieve 44 can be removed and replaced with a different size as required and a new drum a different powder can be provided in drum unloader 39.

In accordance with the present invention, coupons representative of aircraft engine substrates were prepared. Samples were prepared both on bare substrates comprising superalloy material and on substrate to which a bond coat was applied. The bond coat was a well known NiCrAlY. Test coupons were 1"×4" and 3"×3". The powders sprayed were processed NiCrAl balls sized through—400 mesh. The balls were in the size range of 5-30 microns and includes an oxide scale naturally formed by exposure to the atmosphere.

The powder particles were fluidized at a pressure of 5-8 psi and atomized at a pressure of 50 psi to provide a flow pressure from the nozzle of 50 psi. A voltage of 90 kv was applied between the nozzle and the substrate. The NiCrAlY powders were atomized along with a binder comprising Ferro PG-94C, commonly referred to as GROUNDCOAT™, a fused silicate glass frit available from Ferro Corporation, Frit Division, 4150 East 56$^{th}$ Street, Cleveland, Ohio 44101. After application, the coupons were fired at a temperature of 1400-1650° F. for a time of 4-6 minutes.

EXAMPLE 1

A 3"×3" test coupon of 0.060' thick IN 625was prepared. The coupon was coated with a standard NiCrAlY bond coat to a thickness of 3-12 mils. Uncoated iron-based powders and PG-94C binder was then applied to the coupon at a thickness of about 0.013" using the procedure set forth above, including the heat treatment. After heat treatment, the outer strain of the coating was measured and found to be about 0.86%. The PG-94C, discussed above, is included in the final coating to hold other ceramic and metal particles in place.

EXAMPLE 2

A 3"×3" test coupon of 0.060' thick IN 625 was prepared. Uncoated iron-based powder and PG-94C binder was then applied directly to the surface of the coupon (i.e. no bond coat) to a thickness of about 0.013" using the procedure set forth above, including the heat treatment. After heat treatment, the outer strain of the coating was measured and found to be about 1.19%.

EXAMPLE 3

A 3"×3" test coupon of 0.060' thick IN 625 was prepared. The coupon was coated with a standard NiCrAlY bond coat to a thickness of 3-12 mils. Coated iron-based powder and PG-94C binder was then applied to the coupon to a thickness of about 0.041" using the procedure set forth above, including the heat treatment. The The iron-based powder included a naturally-formed aluminum oxide coating. The oxide coating provides electrical isolation among the particles when higher metal loadings are desired. After heat treatment, the outer strain of the coating was measured and found to be about 0.70%.

EXAMPLE 4

A 3"×3" test coupon of 0.060' thick IN 625 was prepared. Iron-based powder having a naturally-developed oxide coating and PG-94C binder was then applied directly to the surface of the coupon (no bond coat) to a thickness of about 0.041" using the procedure set forth above, including the heat treatment. The coated iron-based powder comprises about 60% by weight of the sprayed coating, the sprayed coating being a mixture of coated powder and PG-94C binder. After heat treatment, the outer strain of the coating was measured and found to be about 0.98%.

EXAMPLE 5

A ceramic enamel employed in this example was PG94C frit powder sold by Ferro Corporation. This powder is known as a groundcoat frit powder and comprises silica, barium, fluorides, nickel and zirconium compounds. The powder was used with a Norston powder coating system and the following parameters were employed: 50 psi atomization air, 50 psi flow air, 5 psi fluidization air to fluidized pot, and 90 KV charging. Powder was applied to both bond coated and non-bond coated Inconel 625 coupons. Thirty-nine passes yielded coatings up to 32 mils in thickness. The coatings were flash fired at 1540° F. (838° C.) for 4 to 6 minutes yielding a TBC coating. The bond coating employed was a conventional NiCrAlY coating, which was applied by plasma spray techniques.

EXAMPLE 6

A ceramic enamel was leaded with an electrically isolated metal material to increase the thermal conduction of the coating. PG94C frit powder, 40% by weight, was mixed with alumina coated iron powder and then sprayed with use of a Norston powder coating system using the same parameters as in Example 1. A coating greater than 40 mils was developed and fired at 1540° F. (838° C.) in 6 minutes. Again, both bond coated and non-bond coated Inconel 625 were coated and both formed well adhered coating systems. Ferro's frit powder PL62D, which comprises silica, fluorides, nickel and zirconium compounds, may also be substituted for PG94C with thinner resultant coatings (e.g. 20-30 mils).

While the invention has been set forth in the examples and procedure set forth above, the invention is not so limited. The voltage used in the above examples was limited by the available test equipment. It is envisioned that higher voltages can be used. The only limitation on the voltage used is that the equipment and substrate not be damaged by the applied voltages, such as, for example, by arc strikes. The available voltages limited the coating thicknesses tested. It is envisioned that higher voltages can produce thicker coatings, when so desired.

The above examples 1-4 and 6 utilized iron-based alloy powders. These metal powders are readily charged. However, the powders used for the coating are not so limited, as any powder that can be charged can be applied by the above described process as indicated in example 5. The limitation on the powder is whether the powder can provide the required protection to the substrate.

The above binder was Ferro PG-94C. This binder sets forth the current best mode of practicing the invention. However, other binders also may be acceptable. The binders must be compatible with the electrostatic powder spray procedure. The binder utilized was a glass frit that forms the ceramic matrix of the coating system. It will be recognized that other binder/matrix materials can be utilized that will become a part of the final coating. For example, a silicone may be utilized that can be converted into a glass, a glassy ceramic or a ceramic, depending upon the heat treatment applied and intended use. Whether the binder is incorporated into the final coating or is transitory depends upon the intended use of the article substrate and the component. Other binders that may be used include, but are not limited to, GE SR 350, a silicone based binder, a binder including submicron alumina and smaller particles such as ALCOA A16SG an active alumina and a high temperature glass frit, such as V212, available from Vitrifunctions, Inc., Clawson Ave., Youngwood, Pa. 15697.

The above described heat treatment is effective for PG-94C and iron-based powders. It will be understood that this heat treatment will not be effective to achieve proper adherence of other types of powders, and other heat treatments will be required to develop the required properties of another and different powder or powders as a coating.

Advantages of the above examples include the following: rapid deposition, no drying time or solvents required, no adverse environmental, health and safety effects from solvents, rapid firing and great adhesion.

Additional advantages of embodiments of the invention include an absence of drying problems because the coating goes on dry, as well as an absence of polymer binder/aging problems. Moreover, Applicants' powder coating of gas turbine engine components is a fast process in which it is possible to coat and fire a component in less than 15 minutes. Similarly, the processes described herein are economical, result in high yields and are environmentally friendly in that no solvents are required. Advantageously, coatings such as thermal barrier coatings, sacrificial coatings, anticorrosion coatings and oxidation resistant coatings may be applied in accordance with embodiments of the invention.

The above examples do not reflect the use of additional ceramic fillers, However, ceramic fillers that can be applied by the above spray techniques may also be used as required. In addition, the size of the powders can be varied to provide required coating powders. For example, various sized powders can be applied to provide varying densities. If desired, different powders can be applied in different layers to achieve different densities. Furthermore, powders of different compositions can be applied as distinct layers to achieve different properties in different layers. These different properties may include different mechanical properties, different chemical properties, different environmental properties and different physical properties. However, care must be taken to provide the proper heat treatments to these layers to achieve the desired properties. Multiple heat treatments in the correct sequence may be required. Furthermore, different powders may be sprayed at the same time into a layer to provide novel compositions with unique properties. Once again, care must be taken to provide a proper heat treatment compatible with the powders of different compositions.

The present invention can be used for application of coatings in aircraft engine turbine components that currently are applied by different processes that have disadvantages or that cannot readily be applied at all. For example, by mixing different powders that would otherwise form as a two phase material, and proper heat treatment, a substantially uniform coating can be achieved. By proper selection of powder size, for example by application of metal balls, differences in thermal expansion between the coating and substrate can be accounted for. Thus, by properly sizing metal balls, the coating can expand at a different rate than the underlying substrate to create a strain tolerant coating. Similarly, different layers can be applied with differential expansion rates so that the strain due to thermal expansion can be distributed over the various coating layers to create a strain-tolerant coating, rather than at an interface between a coating and a substrate. TBC coatings can also be applied by the present invention, as it is not limited to metallic balls. By proper selection of materials and sizing of powders, the density of TBC coatings produced by current methods can be duplicated as desired. If desired, the density of these TBC coatings can be varied to produce a strain-tolerant coating or to vary the thermal effects as desired by proper application of porosity and cooling air. Other metals can also be added, such as the family of MCrAlX, a well-known designation for an expansion matching metal coating which can also inhibit corrosion, as well as other expansion matching and/or corrosion inhibiting metal coatings, where M is an element selected from the group consisting of Fe, Ni Co and combinations thereof, while X is selected from the group consisting of Ta, Re and reactive elements, such as Y, Zr, Hf, Si, and grain boundary strengtheners consisting of B, C and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of coating a gas turbine engine component using a powder coating process to produce a tightly adherent coating comprising:
   providing a gas turbine engine component having a solid surface;
   applying a powder coating to the gas turbine engine component solid surface using the powder coating process, wherein the powder coating is applied in a dry form without an organic solvent, the powder coating comprising fritted glass particles and ceramic particles;
   heating the applied powder coating to a temperature sufficient to raise the melting point of the powder coating to melt particles of the powder coating to form a glass matrix with ceramic particles trapped in the matrix;
   wherein heating to the temperature sufficient to melt particles of the powder further fuses the molten powder to the gas turbine engine component solid surface and cures the powder coating on the surface;
   wherein the coating and heating are performed in less than 15 minutes; and
   wherein the cured coating is tightly adherent to the component.

2. The method of claim 1 wherein the temperature sufficient to raise the melting point of the powder coating is about 838° C., and wherein the coating forms a tightly adherent glass/ceramic system on the component surface.

3. The method of claim 1 wherein the step of heating includes firing to a temperature in the range of 200-2400° F.

4. The method of claim 1, wherein the powder coating is applied using a method selected from the group consisting of a fluidized bed process, an electrostatic spray process and an electrostatic brush process.

5. The method of claim 4, wherein the gas turbine engine component is grounded.

6. The method of claim 5, wherein the powder coating consists of a material selected from the group consisting of an inorganic based material and an organic based material.

7. The method of claim 6, wherein the powder coating further comprises a glass/enamel/metal.

8. The method of claim 1, wherein the powder coating further includes ceramic particles selected from the group consisting of silica, alumina, zirconia, magnesium oxide, titania, and hafnia.

9. The method of claim 6 wherein the powder coating is a thermal barrier coating.

10. The method of claim 4 wherein the gas turbine engine component is cleaned prior to application of the powder coating.

11. The method of claim 1, wherein the component includes an electrically conductive non-metallic substrate.

12. The method of claim 1, wherein the powder coating is applied directly to one of the gas turbine engine component solid surface and a bond coat overlying the gas turbine engine component solid surface.

13. The method of claim 1 further including the steps of providing a powder spray gun;
   establishing an electrical potential between the powder spray gun and the gas turbine engine component;
   wherein the step of applying a powder coating includes electrostatically spraying solventless powder particles onto at least a portion of surface of the gas turbine engine component at a flow rate sufficient to provide a powder coating of predetermined thickness; and
   wherein the step of heating is performed at a temperature sufficient to form a bond between the powder coating and the component surface.

14. A method of coating a gas turbine engine component using a powder coating process to produce a tightly adherent coating, comprising the steps of:
   providing a gas turbine engine component having an electrically conductive solid substrate;
   cleaning the gas turbine engine component prior to application of a powder coating;
   applying a powder coating to a solid substrate of the gas turbine engine component using the powder coating process, wherein the powder coating is applied in a dry form without an organic solvent, the powder coating comprising a fritted glass matrix with ceramic particles trapped in the matrix; and
   heating the applied composition to a temperature sufficient to melt the powder coating, by raising the melting point of the glass matrix and reacting the ceramic particles with the glass, wherein heating melts and fuses particles of the powder coating to the gas turbine engine component and cures the powder coating to form a tightly adherent glass/ceramic system; and wherein the coating and heating are performed in less than 15 minutes.

15. A method for coating an aircraft engine component, comprising the steps of:

providing a gas turbine engine component;

providing solventless metal-based powder particles for coating the gas turbine engine component, the metal-based powder particles capable of being electrostatically charged;

providing a powder spray gun;

establishing an electrical potential between the powder spray gun and the gas turbine engine component;

electrostatically spraying the solventless metal-based powder particles onto at least a portion of a surface of the gas turbine engine component at a flow rate sufficient to provide a powder coating of predetermined thickness; and heat treating the coated component at a temperature sufficient to melt and fuse the metal-based powder particles and establish a metallurgical bond between the component surface and the coating, forming a bond between the component surface and the coating; and wherein the spraying and heating are performed in less than 15 minutes.

16. The method of claim 15 wherein the step of heat treating includes heat treating the coated component at a temperature of at least about 1500° F.

17. The method of claim 15 wherein the step of heat treating includes firing the component to a temperature of 1500° F. in a time of about 6 minutes.

18. The method of claim 15 wherein the step of providing the solventless metal-based powder particles further includes providing an additional solventless powder selected from the group consisting of metal powders, organic-based powders, ceramic-based powders and combinations thereof.

19. The method of claim 15 wherein the step of providing the solventless metal-based powder particles includes providing a metal powder having an oxide coating.

20. The method of claim 19 wherein the step of electrostatically spraying the metal-based powder to provide a coating includes providing a coating wherein metal powder particles are isolated from one another within the coating.

21. The method of claim 19 wherein the step of providing the solventless metal-based powder particles includes providing MCrAlX powders, the powders coated with a coating, where X is an element selected from the group consisting of gamma prime formers, solid solution strengtheners, grain boundary strengtheners, reactive elements and combinations thereof and M is an element selected from the group consisting of Fe, Co, Ni and combinations thereof.

22. The method of claim 21 wherein the MCrAlX powders include powders wherein X includes at least one element selected from the group consisting of Ta, Re Y, Zr, Hf, Si, B, C and combinations thereof.

23. The method of claim 21 wherein the solventless metal-based powder particles include NiCrAlY having an oxide coating formed over an outer surface of the powder particles.

24. The method of claim 19 wherein the metal powder particles have sizes in the range of about 5-30 microns.

25. The method of claim 15 wherein the step of providing metal-based powder particles further includes providing metal powder particles coated with a coating selected from the group consisting of an inorganic binder and an oxide coating.

26. The method of claim 25 wherein the metal powder particles include iron-based particles and wherein the iron-based particles are isolated from one another within the coating.

27. The method of claim 26 wherein the iron-based particles are electrically isolated from one another within the powder coating.

28. The method of claim 15 further including the step of consolidating the coating when the coating of predetermined thickness is densified.

29. The method of claim 18 wherein the step of further providing the additional solventless powder particles selected from the group consisting of metal powders, organic-based powders, ceramic-based powders and combinations thereof further includes providing a plurality of powder particles wherein at least one of the powder particles selected includes a binder.

30. The method of claim 29 wherein the binder powder particles includes a glass frit.

31. The method of claim 29 wherein the binder powder particles includes a silicate-based material.

32. The binder of claim 29 wherein the binder powder particles includes aluminum oxide particles of submicron size and smaller.

33. The method of claim 26 wherein the iron-based alloy powder particles additionally include solventless binder powder particles.

34. The method of claim 15 wherein the step of providing solventless metal-based powder particles further includes providing binder powder particles selected from the group consisting of a silicone based binder, aluminum oxide + glass frit and combinations thereof.

35. The method of claim 15 wherein the method of providing a gas turbine engine component further includes providing a gas turbine engine component wherein a portion of the gas turbine engine component includes an overlying bond coat.

36. The method of claim 15 wherein the step of spraying the solventless powder particles includes providing a plurality of layers of powder coating of different densities, each layer having powders of various sizes to provide various densities.

37. The method of claim 15 wherein the step of electrostatically spraying the solventless metal-based powder particles further includes spraying a plurality of layers of powder, each layer having a different composition and different properties.

38. The method of claim 37 wherein the different properties include properties selected from the group consisting of different mechanical properties, different chemical properties, different environmental properties different physical properties, and combinations thereof.

39. The method of claim 15 wherein the step of providing the solventless metal-based powder particles includes providing a plurality of powders of different composition, and the step of electrostatically spraying includes spraying the plurality of powders of different compositions simultaneously in the same layer.

40. The method of claim 39 wherein the step of electrostatically spraying the plurality of solventless metal-based powder particles simultaneously in the same layer provides a layer having a predetermined composition.

41. The method of claim 39 wherein the step of electrostatically spraying the plurality of solventless metal-based powder particles of different compositions simultaneously in the same layer followed by the step of heat treating providing a uniform coating composition.

* * * * *